United States Patent [19]

Kuchuk-Yatsenko et al.

[11] 4,288,676
[45] Sep. 8, 1981

[54] METHOD OF CONTINUOUS FLASH BUTT WELDING AND HYDRAULIC DRIVE OF CONTINUOUS FLASH BUTT-WELDING MACHINE FOR REALIZATION OF THIS METHOD

[76] Inventors: Sergei I. Kuchuk-Yatsenko, ulitsa Filatova, 1/22, kv. 47; Ivan A. Chernenko, ulitsa Vladimirskaya, 98/3, kv. 45; Mikhail V. Bogorsky, ulitsa Ozernaya, 30/51, kv. 120; Alexandr I. Kulesh, prospekt 40 let Oktyabrya, 114, korpus 2, kv. 59; Vitaly T. Cherednichok, Zadorozhny pereulok, 6, kv. 42; Vladimir I. Tishura, ulitsa Chigorina, 55, kv. 27, all of Kiev, U.S.S.R.

[21] Appl. No.: 4,713

[22] Filed: Jan. 19, 1979

[51] Int. Cl.$^3$ .............................................. B23K 11/04
[52] U.S. Cl. ................. 219/100; 219/125.12
[58] Field of Search ........................... 219/100, 125.12

[56] References Cited

FOREIGN PATENT DOCUMENTS

1162073 8/1969 United Kingdom ................ 219/100

Primary Examiner—E. A. Goldberg
Attorney, Agent, or Firm—Steinberg & Raskin

[57] ABSTRACT

In accordance with the disclosure, the workpieces being welded are brought together by rectilinearly oscillating at least one of them along the line of bringing them together with the amplitude in the movement of the workpiece towards the other workpiece greater than that in the movement of the same workpiece in the direction opposite to the direction towards the other workpiece, voltage is applied to said workpieces for flashing and heating them in the course of bringing them together, and then an upset force is applied to the workpieces. The hydraulic drive adapted to generate the oscillatory rectilinear motion in a continuous flash butt-welding machine includes a hydraulic cylinder with two chambers which provides for moving one of the workpieces being welded with respect to the other and comprises apparatus for feeding hydraulic fluid alternately into either of the chambers of the hydraulic cylinder of the machine, the apparatus being connected with the cylinder through two hydraulic lines. The lines serve alternately one as the inlet line and another as the outlet line and are interconnected by two hydraulic conduits, either of which incorporates an adjustable throttle and a check valve. The check valves are arranged so that either of them by-passes hydraulic fluid from the inlet line into the outlet line. The adjustable throttles are adjusted so that the hydraulic fluid volume admitted into the hydraulic cylinder of the machine to move the workpiece towards the other workpiece is greater than the hydraulic fluid volume admitted thereinto to move the same workpiece in the opposite direction.

4 Claims, 6 Drawing Figures

METHOD OF CONTINUOUS FLASH BUTT WELDING AND HYDRAULIC DRIVE OF CONTINUOUS FLASH BUTT-WELDING MACHINE FOR REALIZATION OF THIS METHOD

BACKGROUND OF THE INVENTION

1. Field of the Invention

The present invention relates to methods of continuous flash butt welding and to continuous flash butt-welding machines for realization of these methods, in particular to hydraulic drives of said machines, which provide for moving the workpieces being welded in the course of welding. The invention may be employed in all fields of mechanical engineering to weld workpieces, mainly of a large cross-sectional area, and also where a high output of the welding machine is required.

2. Description of the Prior Art

In contrast to continuous resistance butt welding where current is passed through workpieces whose end faces are tightly pressed against each other, continuous flash butt welding process is characterized in that one of the workpieces being welded is translated towards the other with the welding voltage on.

When the end faces of the workpieces are brought together in such a close relation that ridges of their microirregularities touch one another, electric contacts originate at the points of contact. A high current density in these points causes the metal to rapidly heat up and become liquid. Due to overheating, the formed liquid metal bridges break down, and as the workpieces are brought closer together, contacts are formed at other points.

The process of formation and breakdown of the contacts proceeds continuously, the points of contact between the workpieces change continuously as well, which results in a uniform heating of the workpieces over the entire area of their butted end faces. This provides for a high quality of the weld joint produced by upsetting the workpieces after their end faces have been heated to the required temperature.

The uniformity of heating the workpiece end faces, representing an advantage of continuous flash butt welding over continuous resistance butt welding, makes it possible to weld workpieces of large cross-sectional area, for which purpose the continuous resistance butt welding technique has proven to be incapable.

The process of continuous flash butt welding, however, inevitably involves considerable losses of metal and of heat, stemming from an explosion-like breakdown of the bridges, accompanied by expulsion of hot metal.

Improved prior art methods of continuous flash butt welding provide for reduction of said losses by means of short-time increases in the speed of feeding one of the workpieces being welded towards the other in the course of flashing.

In particular, there is known a method of continuous flash butt welding, wherein the workpieces being welded are brought together by imparting to at least one of them translatory motion towards the other with at least one of the workpieces being set into a rectilinear oscillatory motion along the line of said translatory motion, voltage is applied to said workpieces for flashing and heating them in the course of bringing them together, and then an upset force is applied to the workpieces as disclosed in U.K. Pat. No. 1,162,073.

The above method is accomplished in a clamping device of a continuous flash butt-welding machine, said device comprising current-carrying jaws to clamp the workpiece being welded, which jaws are provided with a hydraulic drive to generate an oscillatory rectilinear motion and mounted for this motion on a column having a self-contained drive to generate a translatory motion as disclosed in U.K. Pat. No. 1,350,682.

Said machine includes a hydraulic cylinder with two chambers, intended to move one of the workpieces being welded with respect to the other.

This movement is effected with the aid of the hydraulic drive which oscillates one of the workpieces being welded and which is a means for feeding hydraulic fluid alternately in either of the chambers of the hydraulic cylinder of said machine, said means communicating with the cylinder through two hydraulic lines serving alternately one as the inlet and another as the outlet line.

The hydraulic cylinder body is fixedly coupled to the machine column, and the rods of the two pistons, either of which is accommodated in a separate chamber, thrust against the walls of a slot provided in the current-carrying jaw. The oscillatory motion of the current-carrying jaws jointly with the workpiece clamped therein is effected within the gap between a projection of one of the jaws and a recess in the column, which receives the projection. The amplitude of the oscillatory motion is restricted by the stroke of either piston and is constant for both directions.

The resulting speed of the oscillating workpiece, which is the resultant of the constant speed of the translatory motion of the column and the varying speed of the oscillatory motion of the current-carrying jaws with respect to the column, varies cyclically in the course of welding. During the half-cycle of the oscillatory motion of the workpiece when after the initial contact of the end faces the workpiece moves in the direction which coincides with that of the translatory motion of the column the resultant speed rises, thus causing the contact area to increase and to reach a value at which flashing ceases and the workpieces being welded are heated by the resistance technique.

During the next half-cycle, when the workpiece moves in the reverse direction, the contact area decreases and the flashing process recommences.

Such a combined heating (by flashing and by resistance) ensures a uniform heating over the entire area of the end faces maintained in abutting relationship and minimizes at the same time the metal and heat losses.

It is to be noted that the efficiency of the above-described method is the higher, the closer the speed of the translatory motion of the column defining the relative movement of the workpieces being welded towards each other is to the speed of flashing of the end faces of said workpieces.

The speeds being equal, the pauses, i.e. time intervals in every oscillatory motion cycle during which the workpieces being welded are out of contact, are the minimum and heating is the most intense.

When the speed of the translatory motion is less than the flashing speed, the spacing between the end faces of the workpieces being welded increases after every oscillatory motion cycle, which lengthens the pauses in current flow and shortens the heating time, thus lowering the welding productivity.

When the speed of the translatory motion exceeds the flashing speed, the spacing between the workpieces after every oscillatory motion cycle decreases, which eventually leads to dampening of the oscillations and termination of flashing. The process of heating proceeds by the resistance method and subsequently transforms into a short circuit, which drastically reduces the amount of heat liberated and impairs the uniformity of its distribution over the area of the end faces maintained in abutting relationship.

To maintain an equality between the translatory motion speed and the flashing speed in practice is, however, a very difficult task, since the flashing speed depends on the temperature of the workpieces being welded, which rises in the course of welding and in its turn depends on the area of the end faces maintained in abutting relationship, the roughness of their surfaces, random variations of the welding voltage, etc.

The above equality between speeds can be in principle maintained in the course of welding by two techniques.

The first of the techniques relies on correcting the speed of the movement of the workpieces towards each other in dependence upon the value of a variable characterizing the flashing process, e.g. on the intensity of welding current, like this is accomplished for the above-described flash butt-welding method wherein the workpieces are brought together by imparting only a translatory motion to one of them as disclosed in Japan Pat. No. 46-8567.

The second technique involves an attempt to effect a self-regulation of the spacing of the workpiece faces maintained in abutting relationship as the faces get flashed.

Realization of the two above techniques is prevented since the workpieces being welded in the course of coming closer together perform two independent motions (translatory and oscillatory), which makes it difficult or as in case of self-regulation, impossible to match a correcting variation of the speed of one motion to appropriate variables of the other motion.

The attempts to attain an equality between the speed of bringing the workpieces together and the speed of their flashing have failed, inasmuch as the inertia of the mechanical units of the continuous flash butt-welding machine (in the embodiment of the invention under consideration, of the column and its drive unit) and of the electrical equipment controlling the translatory motion resulted in delays and linear inaccuracies in execution of control signals which were commensurable with, and even exceeded, the time and linear parameters of the oscillatory motion and thus nullified the effect of the oscillatory motion.

SUMMARY OF THE INVENTION

The principle object of the present invention is to provide a method of continuous flash butt welding, which ensures increasing the welding productivity.

Another object of the invention is to provide a method of continuous flash butt welding, which ensures increasing the efficiency of a flash butt-welding machine.

Still another object of the invention is to provide a method of continuous flash butt welding, which ensures stability of properties of welded workpieces.

Yet another object of the invention is to provide a method of continuous flash butt welding, wherein the relative movement of the workpieces being welded can be effected by a single drive.

One more object of the invention is to provide a hydraulic drive of a simple construction and adapted to oscillate at least one of the workpieces being welded in a continuous flash butt-welding machine for realization of the above method.

An additional object of the invention is to provide a hydraulic drive to generate an oscillatory motion of a controlled amplitude.

The above and other objects of the invention are attained by a method of continuous flash butt welding, wherein voltage is applied to the workpieces being welded for flashing and heating the workpieces in the course of bringing them together, an oscillatory rectilinear motion along the line of bringing the workpieces together is imparted to at least one of them, and then an upset force is applied to said workpieces, and wherein according to the invention, the amplitude of the oscillatory motion imparted to the workpiece in its movement in the direction towards the other workpiece is greater than the amplitude of the oscillatory motion in its movement in the direction opposite to the direction towards the other workpiece.

The above method enables the relative movement of the workpieces being welded towards each other in accordance with the required speed rise and decline pattern corresponding to the optimum conditions of heating the end faces brought in abutting relationship to be effected by single motion, owing to which a self-regulation of the spacing of the butted end faces of the workpieces being welded as the end faces are flashed is attained.

The self-regulation process consists in the following. The movement of one workpiece towards the other, produced by an external driving force (the force developed by the hydraulic drive), proceeds until the resistance to the movement, exerted by this other workpiece, exceeds said force. If this point comes before said first workpiece has travelled a distance equal to the amplitude in the direction towards said second workpiece, the workpieces will be stationary with respect to each other over a time period required to travel a distance equal to the difference between said amplitude and the actually travelled distance.

After this time period expires, the first workpiece starts moving in the opposite direction. Inasmuch as the movement in this direction is unhindered, the distance travelled by the first workpiece in said direction will at all times be one and the same, equal to a double value of the preset amplitude.

Thus, whatever the variations in the flashing speed, the spacing of the end faces of the workpieces being welded at the moment of their maximum separation remains constant, which makes it possible to minimize the pauses and to utilize to the maximum extent the heating effect of current, thereby raising both the welding productivity and the efficiency of the butt-welding machine.

In addition, the constancy of said spacing indicates that a stability of relative positions of the workpieces being welded in all phases of the oscillatory motion has been attained throughout the welding process, which excludes short circuits and ensures the stability of properties of the products welded by the method of the invention.

The difference between the amplitude in the workpiece movement in the direction towards the other workpiece and the amplitude in the movement of the same workpiece in the opposite direction may be selected within 0.01 and 2 mm.

The lower of the above limits is conditioned by the minimum flashing speed required for practical purposes and by the minimum magnitude of the force generating the movement, required for a stable oscillatory motion.

The upper limit is conditioned by the maximum permissible magnitude of deformation of the workpieces being welded (caused by the effect of said force), at which an adequate quality of a weld is still possible.

The optimum flashing conditions ensuring an economically expedient welding productivity and an adequate quality of the weld are created with said difference being within 0.02 and 1 mm for ferrous metal workpieces, and within 0.04 and 1.5 mm for nonferrous metal ones.

The above and other objects of the invention are also attained by providing for realization of said method a hydraulic drive adapted to rectilinearly oscillate at least one of the workpieces being welded in a continuous flash butt-welding machine having a hydraulic cylinder with two chambers which provides for moving one of the workpieces being welded with respect to the other. The hydraulic drive comprises a means for feeding hydraulic fluid alternately into either of the chambers of the hydraulic cylinder of said machine, which means communicating with the cylinder through two hydraulic lines serving alternately one as the inlet and another as the outlet line. According to the invention, said lines are interconnected by two hydraulic conduits, either of which incorporates an adjustable throttle and a check valve, the check valves being arranged so that either of them by-passes hydraulic fluid from the inlet line into the outlet line, and the adjustable throttles being adjusted so that the hydraulic fluid volume admitted into the hydraulic cylinder of the machine to move the workpiece in the direction towards the other workpiece is greater than the hydraulic fluid volume admitted thereinto to move the same workpiece in the direction opposite to the direction towards the other workpiece.

The above-described hydraulic drive ensures by the simplest constructional means generation of a rectilinear oscillatory motion whose pattern in accordance with the above-described method involves a greater amplitude in the movement of the workpiece in the direction towards the other workpiece than the amplitude in the movement of the same workpiece in the direction opposite to the direction towards the other workpiece. Such an arrangement of the hydraulic drive enables the method of the invention to be implemented with the construction of the butt-welding machine essentially unchanged.

BRIEF DESCRIPTION OF THE DRAWINGS

The invention will now be explained with reference to particular embodiments thereof taken in conjunction with the accompanying drawings, wherein.

DETAILED DESCRIPTION OF THE INVENTION

Figure 5:
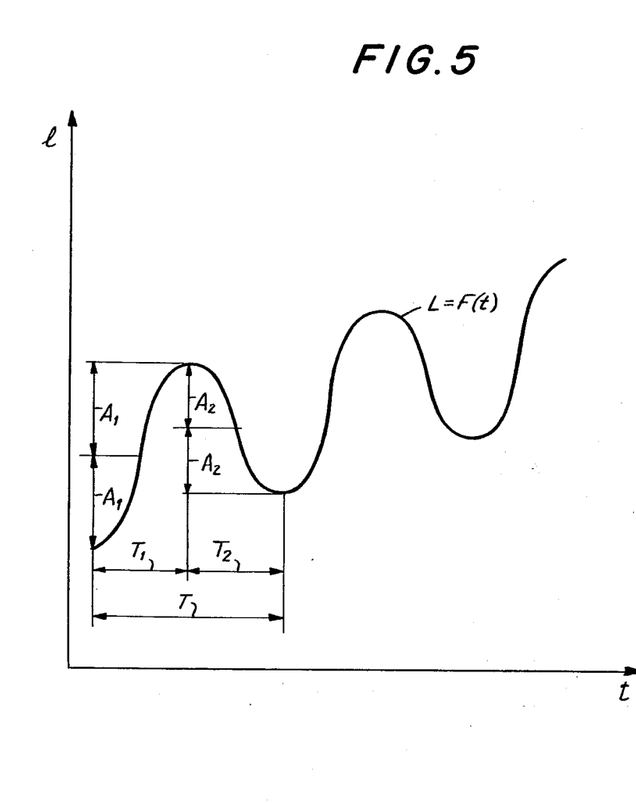
FIG. 5 is a graphical illustration depicting a pattern of oscillations for one workpiece with time at a time when it does not contact the other workpiece.

Referring to FIG. 5, the pattern of oscillations for one of the workpieces at a time when it is not in contact with the other workpiece is illustrated. The following symbols are utilized:

$L = F(t)$—pattern of workpiece oscillations $A_1$—oscillation amplitude of a workpiece oscillating as it is drawn toward the other workpiece $A_2$—amplitude of the workpiece oscillating as it is withdrawn from the other workpiece $T$—oscillation period Method of continuous flash butt welding according to the invention is accomplished in the following manner.

Voltage is applied to the workpieces to be welded and movement of the workpieces toward each other is initiated. The workpieces are brought together by rectilinearly oscillating one of them along the line of bringing them together with the amplitude of the movement of the workpiece towards the other workpiece (in the direction of approach) greater than the amplitude of the movement of the same workpiece in the opposite direction (in the direction of separation). Such a pattern of bringing the workpieces together as illustrated in FIG. 5 ensures their periodic approach into contact with each other and separation.

The amplitude is selected with account for the mass of the movable column of the butt-welding machine realizing the method of the invention, the friction forces arising in movement of the column, the material of the workpieces being welded, their cross-sectional area and shape, and also the frequency of the oscillatory motion.

Figure 6:
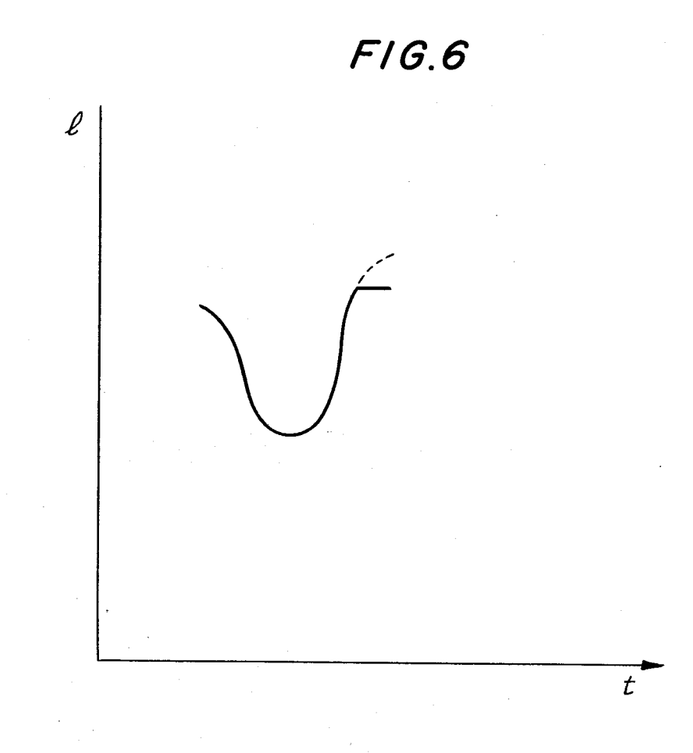
FIG. 6 is a graphical illustration similar to FIG. 5 depicting the oscillation of one the workpieces with time in the course of flashing.

Welding current starts flowing through the workpieces from the moment when their end faces touch each other. The workpiece contact zone is formed at this moment by separate point contacts between the ridges of microirregularities. The contacts progressively heat up and explode under the action of current passing therethrough, the explosion of the contacts being accompanied by expulsion of metal. FIG. 6 illustrates oscillations of the workpiece in the course of flashing. Craters are formed at the points of exploded contacts and, since bringing the workpieces together continues, new contacts of various size originate in other points of the cross-section being welded. In other words, the number and area of contact points increases within each successive oscillation period T. The new contacts again heat up and explode. In this manner the process of flashing of the end faces of the workpieces being welded proceeds.

The explosions of fine contacts result in that the contact zone smoothens and the area of newly formed contacts increases. The increase in the area of the contacts with successive oscillations leads to lengthening the time of their existence and, as a consequence, to their considerable deformation due to continuing relative movement of the workpieces towards each other.

This results in a still further increase in the area of the workpiece contact zone and in a gradual termination of explosions of the contacts, i.e. in interrupting the flashing process.

In the course of separation of the workpieces, the contact zone diminishes and takes the form of separate point contacts which become progressively thinner until current passing therethrough heats them up to such an extent that they start exploding. A new phase of the workpiece flashing process begins.

After the separation of the workpieces is completed, an insignificant spark gap is formed therebetween. Then the next oscillation cycle starts and, inasmuch as the amplitude of the movement of the oscillating workpiece in the direction of approach is greater than the amplitude in the movement of the same workpiece in the opposite direction, the workpieces come together, whereupon the process of formation, heating, and explosions of contacts repeats.

Since the amplitude in the movement of the workpiece in the direction of separation is at all times one and the same for all the oscillation cycles, the width of the spark gap between the workpieces being welded will always be stable. In other words, the spacing of the end faces of said workpieces maintained in abutting relationship, is self-regulated as the end faces are flashed off.

The stability of the spark gap makes it possible to minimize its width and thereby to shorten to the maximum extent the pauses in the welding current flow through the workpieces. This speeds up flashing of the workpieces and thereby intensifies their heating, which raises the welding productivity.

Inasmuch as the same spark gap is formed before the start of every oscillation cycle, the areas (and hence the electrical resistances) of the workpiece contact zone, corresponding to the same phase of different oscillatory motion cycles, will be identical for all the cycles. This indicates that in every oscillatory motion cycle the speed of bringing the workpieces together is equal to the speed of their flashing and hence that the most favourable welding conditions have been attained.

When presetting the pattern of bringing together the workpieces being welded, the difference between the amplitude in the movement of the oscillating workpiece in the direction of approach and the amplitude in the movement of the same workpiece in the direction of separation is selected within 0.01 and 2 mm. With the above difference within this range, the flashing of workpieces is of a stable nature, which ensures a high strength of the weld.

Specific values of the amplitude difference are selected depending on the material of the workpieces to be welded, their cross-sectional shape and area, the type of the butt-welding machine, the frequency of the workpiece oscillatory motion, etc.

Workpieces of a ferrous metal are welded at an amplitude difference selected within 0.02 and 1 mm, and workpieces of a non-ferrous metal, within 0.04 and 1.5 mm, which creates the optimum flashing conditions assuring a high welding productivity.

It is to be noted that the recommencement of the flashing of workpieces in every cycle of the oscillatory motion excludes short circuits and enhances the reliability of conducting the welding process.

During every cycle of said motion, the workpieces are heated by two techniques, by resistance and by flashing, owing to which a uniformity of the heating is attained. This makes it possible to produce welds exhibiting stable properties.

An alternative embodiment of the invention is also possible, wherein the oscillatory motion of the above-described pattern is imparted to both workpieces being welded. The choice of one or another embodiment of the invention is conditioned by the construction of the welding equipment, conditions of conducting the welding operations, and required productivity.

When the workpieces have been flashed off to the predetermined length and heated to the required temperature, an upset force is applied thereto in a conventional manner. The magnitude of the force is selected depending on the material of the workpieces as well as on their cross-sectional shape and area.

Figure 1:
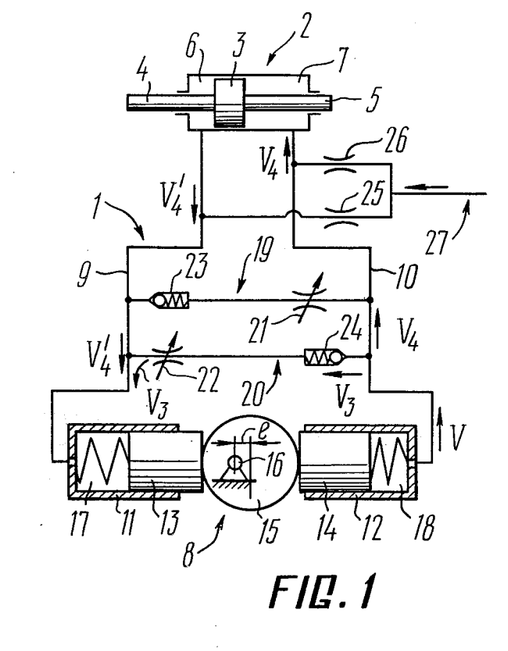
FIG. 1 shows a diagram of the hydraulic drive adapted to rectilinearly oscillate at least one of the workpieces being welded in a continuous flash butt-welding machine for realization of the method of continuous flash butt welding according to the invention (arrows indicate the directions of flows of hydraulic fluid)

The oscillatory motion whose amplitude, in accordance with the method of the invention, is dissimilar at different phases of movement of the oscillating workpiece is accomplished in a continuous flash butt-welding machine with the aid of a hydraulic drive 1 (FIG. 1). Said machine incorporates a hydraulic cylinder 2 intended to move one of the workpieces to be welded with respect to the other. The hydraulic cylinder 2 has a piston 3 with two rods 4 and 5 of the same diameter. The piston 3 divides said cylinder into two chambers 6 and 7, filled with hydraulic fluid.

The body of the hydraulic cylinder 2 is coupled to a stationary column, and the piston 3, to a movable column of the butt-welding machine, which columns carry the workpieces to be welded (said workpieces and columns are not shown in the drawing). It will be clear that the body of the hydraulic cylinder 2 and the piston 3 can also be otherwise coupled to said columns: the body, to the moving column, and the piston, to the stationary one.

The hydraulic drive 1 comprises a means 8 for feeding hydraulic fluid alternately into either of the chambers of the hydraulic cylinder 2. The means 8 is connected with the hydraulic cylinder 2 through two hydraulic lines 9 and 10 which serve alternately one as the inlet and another as the oulet line for the hydraulic cylinder 2.

The means 8 for feeding hydraulic fluid incorporates two hydraulic cylinders 11 and 12 with spring-loaded plungers 13 and 14 and an eccentric 15 contacting the plungers and mounted with an eccentricity "e" on a shaft 16 coupled to a rotational drive means (not shown). The plungers 13 and 14 define respectively in the hydraulic cylinders 11 and 12 chambers 17 and 18 filled with hydraulic fluid.

Described herein is one of possible modifications of the means 8 for feeding hydraulic fluid. It will be apparent to those skilled in the art that said means may be variously otherwise constructed.

In accordance with the invention, the lines 9 and 10 are interconnected by two hydraulic conduits 19 and 20, either of which incorporates an adjustable throttle 21 and 22 respectively and a check valve 23 and 24 respectively. The check valves 23 and 24 are arranged in the hydraulic conduits 19 and 20 so that either of the valves by-passes hydraulic fluid from the inlet line into the outlet line and excludes the flow of the fluid in the reverse direction.

The throttle 22 is intended to control the travel of the piston 3 to the left (as seen in the drawing), and the throttle 21, to control the travel of said piston to the right. Said throttles are set so that the hydraulic fluid volume admitted into the hydraulic cylinder 2 to move the workpiece towards the other workpiece, i.e. in the direction of approach (to move the piston 3 e.g. to the left as seen in the drawing) is greater than the hydraulic fluid volume admitted thereinto to move the workpiece in the opposite direction, i.e. in the direction of separation (to move the piston 3 to the right as seen in the drawing), with the result that the travel of the piston 3 to the left will exceed its travel to the right.

Inasmuch as the travel of the piston 3 defines the amplitude of the workpiece oscillatory motion generated by the above-described hydraulic drive, said amplitude in the half-cycle corresponding to the movement of the workpiece in the direction of approach will be greater than said amplitude in the half-cycle corresponding to the movement of the same workpiece in the direction of separation. The magnitudes of the amplitude in either of the half-cycles are preset by appropriately varying the free area of the throttles 21 and 22.

To compensate for possible hydraulic fluid leaks, the lines 9 and 10 are connected through throttles 25 and 26 respectively to a make-up system 27.

The above-described hydraulic drive functions as follows. When the rotational drive means is turned on, the shaft 16 starts rotating the eccentric 15 which acts upon the plungers 13 and 14 to force hydraulic fluid alternately out of the chambers 17 and 18 into the lines 9 and 10 respectively. The volumes of fluid forced out are defined by the value of the eccentricity "e" of the eccentric 15 and by the diameters of the plungers 13 and 14.

Let us assume that before the rotation commences, the eccentric 15 occupies the position shown in FIG. 1. When rotated through 180°, the eccentric 15 forces hydraulic fluid of a volume V out of the chamber 17 of the hydraulic cylinder 11 into the line 9 and comes to the position shown in FIG. 2. Inasmuch as the plunger 14 is all the time pressed against the eccentric 15, the chamber 18 of the hydraulic cylinder 12 will then increase by the same volume.

Figure 2:
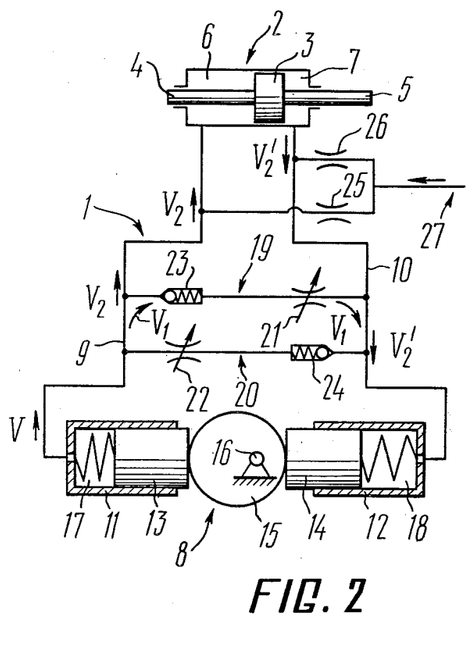
FIG. 2 shows the same as in FIG. 1 in the next half-cycle of the oscillatory motion.

The flow of fluid of the volume V is divided into two flows $V_1$ and $V_2$. The flow $V_1$ passes from the line 9 into the hydraulic conduit 19 and via the check valve 23 and the throttle 21 is directed into the chamber 18 of the hydraulic cylinder 12, while the flow $V_2$ passes via the line 9 into the chamber 6 of the hydraulic cylinder 2 and displaces the piston 3 to the right, forcing fluid of a volume $V_2'$ out of the chamber 7, which fluid via the line 10 is directed into the chamber 18 of the hydraulic cylinder 12.

Since the diameters of the rods 4 and 5 are equal, the effective area of the piston 3 on the side of the chamber 6 is the same as the effective area of the same piston on the side of the chamber 7; hence the volumes $V_2$ and $V_2'$ are equal as well. The volume of fluid forced out of the chamber 17 of the hydraulic cylinder 11, i.e. $V_1+V_2$, is thus equal to the volume of fluid entering the chamber 18 of the hydraulic cylinder 12, i.e. $V_1+V_2'$.

Rotating through the next 180° and returning to the position shown in FIG. 1, the eccentric 15 forces fluid of a volume V out of the chamber 18 of the hydraulic cylinder 12 into the line 10. The chamber 17 of the hydraulic cylinder 11 increases by the same volume V.

The flow of fluid of the volume V is divided into two flows $V_3$ and $V_4$. The flow $V_3$ passes from the line 10 into the hydraulic conduit 20 and via the check valve 24 and the adjustable throttle 22 is directed into the chamber 17 of the hydraulic cylinder 11, while the flow $V_4$ passes via the line 10 into the chamber 7 of the hydraulic cylinder 2 and displaces the piston 3 to the left, forcing fluid of a volume $V_4'$ (which equals the volume $V_4$) out of the chamber 6, which fluid via the line 9 is directed into the chamber 17 of the hydraulic cylinder 11.

It is readily apparent that the volume of fluid forced out of the chamber 18 of the hydraulic cylinder 12 ($V_3+V_4$) is equal to the volume of fluid entering the chamber 17 of the hydraulic cylinder 11 ($V_3+V_4'$).

The values of the volumes $V_1$ and $V_3$ are set by appropriately adjusting the free areas of the throttles 21 and 22 respectively. Setting $V_3<V_1$ yields $V_4>V_2$, i.e. the condition when the travel of the piston 3 to the left, defining the amplitude of workpiece oscillation in a half-cycle wherein the workpiece moves in the direction of approach, exceeds the travel to the right, defining said amplitude in a half-cycle wherein the same workpiece moves in the direction of separation.

The above-described hydraulic drive can also be employed to generate opposite oscillatory motions of the two workpieces being welded. To accomplish this, the construction of the butt-welding machine is to be changed in part so that the stationary column of said machine, coupled, as described above, to the body of the hydraulic cylinder 2, is adapted for movement towards the movable column of the machine, i.e. so that both columns are movable.

Figure 3:
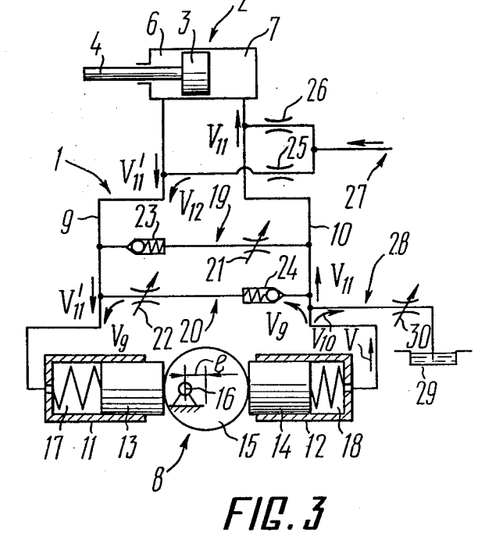
FIG. 3 shows the same as in FIG. 1 for a modification of the continuous flash butt-welding machine, wherein the piston of the hydraulic cylinder of the machine has one rod.
Figure 4:
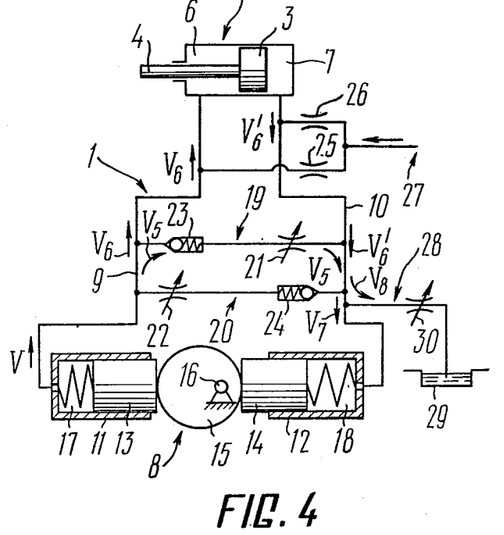
FIG. 4 shows the same as in FIG. 3 in the next half-cycle of the oscillatory motion.

In the event when the construction of the butt-welding machine is such that the piston 3 of the hydraulic cylinder 2 of the machine has one rod 4, due to which the effective areas of the piston on the side of the chamber 6 and on the side of the chamber 7 are unequal, the hydraulic drive 1 is modified in accordance with the modification shown in FIGS. 3 and 4.

According to this modification, the above-described hydraulic drive 1 incorporates a hydraulic conduit 28 (FIG. 3) whose one end is connected to that of the lines which communicates with the larger (with respect to the size of the effective area of the piston 3) of the chambers 6 and 7 (in the drawing, with the line 10) and whose other end is connected to a drin tank 29. The hydraulic conduit 28 incorporates an adjustable throttle 30 to control the fluid flow passing therethrough.

The hydraulic drive 1 according to the above modification functions as follows. When the eccentric 15 is rotated from the position shown in FIG. 3 to the position shown in FIG. 4, hydraulic fluid of a volume V is forced out of the chamber 17 of the hydraulic cylinder 11 into the line 9; the chamber 18 of the hydraulic cylinder 12 increases by the same volume.

The flow of fluid of the volume V is divided, in a similar manner as described above, into two flows $V_5$ and $V_6$. The flow $V_5$ is directed via the hydraulic conduit 19 into the chamber 18 of the hydraulic cylinder 12, while the flow $V_6$ passes into the chamber 6 of the hydraulic cylinder 2 and displaces the piston 3 to the right, forcing fluid of a volume $V_6'$ from the chamber 7 into the line 10. The volume $V_6'$ is greater than the volume $V_6$, since the effective area of the piston at the right (as seen in the drawing) is greater than the effective area of the piston at the left.

The flow $V_6'$ is divided into two flows $V_7$ and $V_8$. The flow $V_7$ equal in volume to the flow $V_6$ passes into the chamber 18 of the hydraulic cylinder 12, while the flow $V_8$ equal in the volume to the difference between the flows $V_6'$ and $V_6$ is directed through the hydraulic conduit 28 into the drain tank 29.

When the eccentric 15 is further rotated to the position shown in FIG. 3, fluid of the volume V is forced out of the chamber 18 of the hydraulic cylinder 12 into the line 10; the chamber 17 of the hydraulic cylinder 11 increases by the same volume V.

The flow of fluid of the volume V is divided into three flows $V_9$, $V_{10}$, and $V_{11}$. The flow $V_9$ passes via the hydraulic conduit 20 into the chamber 17 of the hydraulic cylinder 11. The flow $V_{10}$ is directed via the hydraulic conduit 28 (since the throttle 30 remains open) into the drain tank 29. The volume of the flow $V_{10}$ is defined by the size of the preset free area of the throttle 30 and is equal to the volume of the flow $V_8$ (FIG. 4).

The flow $V_{11}$ (FIG. 3) passes into the chamber 7 of the hydraulic cylinder 2 and displaces the piston 3 to the left, forcing fluid of a volume $V_{11}'$ out of the chamber 6 into the line 9. The flow $V_{11}'$ whose volume is less than the volume $V_{11}$ passes into the chamber 17 of the hydraulic cylinder 11. The same chamber 17 receives also a flow $V_{12}$ delivered from the make-up system 27. The size of the free area of the throttle 25 is preset so as to obtain the following relationship:

$$V_{12} = V_{11} - V_{11}' + V_{10}.$$

It will be readily found that with this relationship the volume of fluid forced out of the chamber 18 of the hydraulic cylinder 12 equals the volume of fluid passed into the chamber 17 of the hydraulic cylinder 11.

Presented below are examples of realization under laboratory conditions of the method of continuous flash butt welding of the invention with the use of various continuous flash butt-welding machines with welder transformer capacities of 150 to 300 kVA.

EXAMPLE 1

Welded together were two alloy-steel half-rings with an end face area of 900 mm².

An oscillatory motion at a frequency of f=14 Hz was imparted to one of the rings. The oscillation amplitude in the half-cycle corresponding to the movement of the workpiece in the direction of approach was $A_1 = 0.25$ mm, and in the half-cycle corresponding to the movement of the workpiece in the direction of separation, $A_2 = 0.15$ mm. The amplitude difference was thus $\Delta A = 0.10$ mm.

When the workpieces had been flashed and heated to the required temperature, an upset force was applied thereto.

The welding time was 4 to 5 s, whereas with the use of the prior art technique wherein the oscillation amplitude in both half-cycles is the same, welding of said workpieces took 10 s.

EXAMPLE 2

Welded together were two low-carbon steel pipes with a cross-sectional area of 4,000 mm².
The parameters of the process were as follows:
f = 16 Hz
$A_1 = 0.25$ mm
$A_2 = 0.18$ mm
$\Delta A = A_1 - A_2 = 0.07$ mm
The welding time was 30 s. Welding of the same workpieces with the use of the prior art technique took 60 s.

EXAMPLE 3

Welded together were two high-carbon steel rails with a cross-sectional area of 8,600 mm².
The parameters of the process were as follows:
f = 70 Hz
$A_1 = 0.11$ mm
$A_2 = 0.10$ mm
$\Delta A = 0.01$ mm
The welding time was 35 s. Welding with the use of the prior art technique took 80 s.

EXAMPLE 4

Welded together were two square rolled sections of a titanium alloy with a cross-sectional area of 2,000 mm².
The parameters of the process were as follows:
f = 5 Hz
$A_1 = 2.5$ mm
$A_2 = 0.5$ mm
$\Delta A = 2$ mm
The welding time was 30 s. Welding with the use of the prior art technique took 50 s.

EXAMPLE 5

Welded together were two cylindrical workpieces of a high-carbon steel with a cross-sectional area of 25,000 mm².
The parameters of the process were as follows:
f = 24 Hz
$A_1 = 0.7$ mm
$A_2 = 0.2$ mm
$\Delta A = 0.5$ mm
The welding time was 180 s. Welding of the same workpieces with the use of the prior art technique took 400 s.

EXAMPLE 6

Welded together were two round rolled sections of an aluminium alloy with a cross-sectional area of 2,000 mm².
The parameters of the process were as follows:
f = 40 Hz
$A_1 = 0.55$ mm
$A_2 = 0.30$ mm
$\Delta A = 0.25$ mm
The welding time was 25 s vs. 35 s with the use of the prior art technique.

EXAMPLE 7

Welded together were two square rolled sections of an aluminium alloy with a cross-sectional area of 3,600 mm².
The parameters of the process were as follows:
f = 20 Hz
$A_1 = 1.5$ mm
$A_2 = 0.5$ mm
$\Delta A = 1$ mm
The welding time was 45 s. Welding of the sections with the use of the prior art technique took 70 s.

While particular embodiments of the invention have been shown and described, various modifications thereof will be apparent to those skilled in the art.

Various modifications may be made in the invention without departing from the spirit and scope of the following claims.

What is claimed is:

1. A method of continuous flash butt welding comprising: bringing together and moving apart the workpieces to be welded by imparting to at least one of them an oscillatory rectilinear motion along the line of bringing them together and moving apart with the amplitude in the movement of said at least one workpiece in the direction towards the other of said workpieces greater than the amplitude in the movement of the same said workpiece in the direction of moving apart, applying voltage to said workpieces being welded for flashing and heating the workpieces in the course of bringing them together and moving apart, and subsequently applying an upset force to said workpieces being welded.

2. A method in accordance with claim 1, wherein the difference between the amplitude in the movement of said workpiece towards the other said workpiece and the amplitude in the movement of the same said workpiece in the opposite direction is within 0.01 and 2 mm.

3. A method in accordance with claim 2, wherein to weld workpieces of a ferrous metal, the difference between the amplitude in the movement of said workpiece towards the other said workpiece and the amplitude in the movement of the same said workpiece in the opposite direction is within 0.02 to 1 mm.

4. A method in accordance with claim 2, wherein to weld workpieces of a nonferrous metal, the difference between the amplitude in the movement of said workpiece towards the other said workpiece and the amplitude in the movement of the same said workpiece in the opposite direction is within 0.04 and 1.5 mm.

* * * * *